US005644236A

United States Patent [19]
Strosser et al.

[11] Patent Number: 5,644,236
[45] Date of Patent: Jul. 1, 1997

[54] METHOD AND APPARATUS FOR SIMULTANEOUSLY TESTING THE INDUCTANCE OF DETECTION COILS IN A MULTIPLE CHANNEL METAL DETECTOR

[75] Inventors: Richard P. Strosser, Akron; Mark K. Chow, Paoli, both of Pa.

[73] Assignee: New Holland North America, Inc., New Holland, Pa.

[21] Appl. No.: 414,330

[22] Filed: Mar. 31, 1995

[51] Int. Cl.[6] .............................. G01V 3/10; G01R 31/02
[52] U.S. Cl. ........................ 324/326; 324/546; 324/202
[58] Field of Search ................................ 324/326, 202, 324/207.14–207.19, 228–243, 260, 546, 207.12, 726, 327; 340/684, 551

[56] References Cited

U.S. PATENT DOCUMENTS

| | | | |
|---|---|---|---|
| 3,408,493 | 10/1968 | Westover et al. | 324/202 |
| 4,084,135 | 4/1978 | Enabnit | 324/202 |
| 4,433,528 | 2/1984 | Bohman | 340/684 |
| 4,480,753 | 11/1984 | Thomas et al. | 209/546 |
| 4,538,771 | 9/1985 | Tardy | 324/546 |
| 4,639,666 | 1/1987 | Strosser et al. | 324/239 X |
| 4,866,377 | 9/1989 | Macovschi | 324/202 |
| 5,043,666 | 8/1991 | Tavernetti et al. | 324/326 |

OTHER PUBLICATIONS

Raymond Serway; Mutual Inductace; Physics for Scientists and Engineers; Saunders College Publishing; pp. 731–732 1986.

Primary Examiner—Sandra L. O'Shea
Assistant Examiner—J. M. Patidar
Attorney, Agent, or Firm—Griffin, Butler, Whisenhunt & Kurtossy

[57] ABSTRACT

In a two-channel magnetic metal detector having first and second mutually inductively coupled detection coils connected to first and second detection channels, respectively, the inductance of the coils is tested by applying a square wave test signal to the first detection coil and determining if the resulting output signal from the second detection channel has a magnitude falling within a range of magnitudes defined by two threshold values stored in a non-volatile memory. A microcomputer applies digital signals to a digital to analog converter to generate the square wave. The output signal from the second detection channel is repetitively sampled and digitized and the digital values are transferred to the microcomputer which includes means for comparing the digital values with the threshold values. If a comparison determines that the magnitude of the output signal from the second detection channel does not fall within the range of magnitudes defined by the threshold values, the microcomputer generates an error indication.

8 Claims, 1 Drawing Sheet

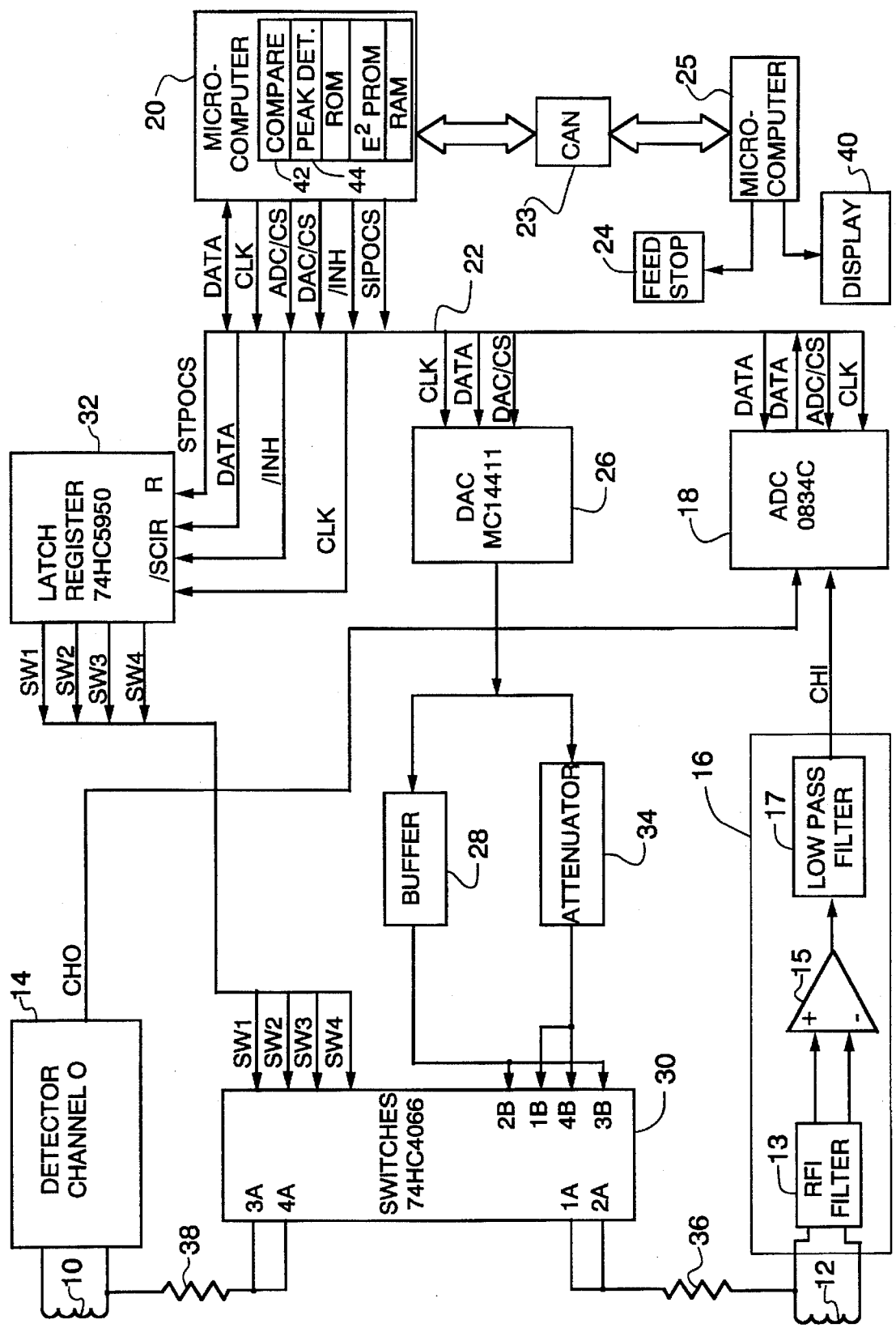

1

METHOD AND APPARATUS FOR SIMULTANEOUSLY TESTING THE INDUCTANCE OF DETECTION COILS IN A MULTIPLE CHANNEL METAL DETECTOR

RELATED APPLICATIONS

This application is related to the concurrently filed applications of Strosser Ser. No. 08/414,788, now U.S. Pat. 5,600,942 entitled Metal Detector Coil Resistance Testing and Ser. No. 08/414,329 entitled Adaptive Thresholding For Metal Detection, both assigned to the same assignee as the present application.

FIELD OF THE INVENTION

This invention relates to the testing of detection coils in a metal detector and more particularly to the testing of the inductance of the detection coils in a multi-channel magnetic metal detector.

BACKGROUND OF THE INVENTION

It is conventional to provide metal detectors in crop processing machines such as forage harvesters, the purpose of the metal detectors being to detect metal picked up from a field with the crop material. When the metal detector detects the passage of a metal object through the crop feed path, the detector produces an output signal to stop the crop feed mechanism before the metal object can be fed into the crop cutter knives.

As illustrated in Bohman U.S. Pat. No. 4,433,528, the metal detector detection coils and associated detection circuits may be located within a housing to protect them from dust and moisture and the housing may in turn be located within a rotatable crop feed roll so as to position the detection coils as close as possible to the crop feed path. Furthermore, the coils may also be encased in a potting material. This makes it difficult to access the detection coils for test purposes. On the other hand, it is desirable that the metal detector be frequently checked to assure its sensitivity and operability because if the metal detector is not functioning properly metal objects may not be detected and thus may enter the cutter mechanism where they may cause considerable damage.

It would be possible to provide an additional coil for testing purposes, the test coil being disposed in proximity to the detection coils so that an emf (electromotive force) is induced in the detection coils upon application of a signal to the test coil. However, this adds to the cost of producing the system. Furthermore, the limited space available within the housing in which the metal detector is located makes it difficult to add an additional coil.

Some metal detectors, such as the one illustrated in U.S. Pat. No. 4,433,528 have two channels. That is, the detectors have two detection coils each connected to a respective one of two detection circuits which serve to amplify and filter the output signals from the detection coils. To insure a more uniform sensitivity of the metal detector across the width of the crop feed path, each detection coil is formed so as to comprise a series of generally triangular segments, the segments of one coil nesting between two segments of the other coil. Because of the close spacing, the detection coils are mutually inductively coupled. The present invention utilizes this mutual inductance in the testing of the inductance of the coils.

SUMMARY OF THE INVENTION

An object of the present invention is to provide a method of testing the inductance of first and second detection coils in a magnetic metal detector having first and second detection channels, the detection coils being mutually inductively coupled and the first and second detection coils being connected to the first and second detection channels, respectively, the method comprising injecting a test signal into the first detection coil and, while the test signal is being injected into the first detection coil, determining if the second detection channel produces an output signal having a magnitude at least as great as a first threshold magnitude.

Another object of the invention is to provide a method as described above wherein the injected test signal is a square wave.

A further object of the invention is to provide an apparatus for testing the inductance of the detection coils in a magnetic metal detector having first and second mutually inductively coupled detection coils connected to first and second detection circuits, respectively, the apparatus comprising means for injecting a test signal into the first detection coil and means for determining the magnitude of an output signal produced by the second detection circuit while the test signal is being injected. The means for injecting the test signal comprises a microcomputer which controls a digital to analog converter so that the converter produces a square wave as the test signal. The means for determining the magnitude of the output signal from the second detection circuit comprises an analog to digital converter for sampling and digitizing the output signal and means, implemented in the microcomputer for comparing the digitized output signal with first and second threshold values stored in a microcomputer memory and defining the limits of the range of values within which the digitized output signal should fall when the inductance of the detection coils is within tolerance limits.

Other objects and advantages of the invention and the manner of implementing it will become obvious upon consideration of the following description and the accompanying drawing.

BRIEF DESCRIPTION OF DRAWING

The single drawing figure is a schematic circuit diagram showing a prior art metal detector and a test apparatus according to the present invention.

DESCRIPTION OF PREFERRED EMBODIMENT

As shown in the drawing, a prior art two-channel metal detector comprises first and second detection coils 10, 12, connected to respective first and second detection circuits or channels 14, 16. The detection coils 10, 12 are mutually inductively coupled and are disposed in a static magnetic detection field produced by permanent magnets (not shown). The arrangement of the coils 10, 12 and the permanent magnets may be as shown in U.S. Pat. No. 4,433,528. The detection circuits typically include an RFI filter 13 for filtering out RFI picked up by the detection coil, amplifier means 15 for amplifying the difference in potential across the detection coil connected to it and a low pass audio filter 17 for filtering out the "noise" induced in the detection coil by cyclically moving parts of the harvester machine. It will be understood that the metal detector is disposed adjacent the crop feed path of a forage harvester or other harvesting machine as shown in U.S. Pat. No. 4,433,528 so that metal objects passing through the crop feed distort the lines of flux of the detection field thereby inducing an emf across the detection coils 10, 12.

During normal operation of the metal detector, that is, when it is being operated to detect metal objects passing through the crop feed path, the signals induced in coils 10, 12 by the detected objects are amplified and filtered by detection circuits 14 and 16 and the resulting output signals CH0 and CH1 from the detection circuits are applied to an analog to digital converter (ADC) 18. The ADC is controlled by a microcomputer 20 via a serial data link 22 so as to sample and digitize the output signals CH0 and CH1 every 2.5 ms. The digitized signals are then compared to threshold values in microcomputer 20, the above-referenced copending application Ser. No. 08/414,788. If a digitized signal exceeds a threshold value the microcomputer 20 produces an output signal that passes over serial link 23, which may be a Controller Area Network (CAN) to a second microcomputer 25. The microcomputer 25 then issues a stop signal to a stop means 24 which stops the crop feed mechanism (not shown).

In accordance with the present invention, the inductance of detection coils 10, 12 is tested by injecting a test signal of known magnitude into the detection coil connected to one detection circuit and determining the magnitude of the resulting output signal from the other detection circuit. The apparatus for injecting the test signal comprises an digital to analog converter 26, a buffer 28, FET switches 30 and a latch register 32, in addition to microcomputer 20.

Latch register 32 is an 8-bit serial input/parallel output register with latches. Data and control signals are applied to the register from microcomputer 20 via the serial data link 22. At the beginning of a detection coil test, the latch register is loaded with a code word having a 1-bit in one position so that the register produces one of the signals SW1–SW4. The signals SW1–SW4 are applied to addressing or selection inputs of the FET switch chip 30 to thereby enable one switch and connect one of the switch inputs 1B, 2B, 3B, 4B to one of the switch outputs 1A, 2A, 3A, 4A, respectively.

After the latch register has been loaded, the microcomputer 20 enables DAC 26 every 2.5 ms and transfers to a holding register in the DAC a digital value representing a point on a square wave. The digital values applied to DAC 26 are such that the DAC produces a square wave output signal having a low frequency. The frequency is such that an output signal, produced by the amplifier 15 in one of the detection circuits 14, 16 in response to the square wave as subsequently described, will pass through the low pass filter 17 in the detection circuit. The square wave signal is applied in parallel through buffer 28 and an attenuator 34 to inputs of switches 30. The attenuator 34 is used only during resistance testing of detection coils 10, 12 as explained in above-referenced application Ser. No. 08/414,788 and is not used during inductance testing of the coils.

The code word initially loaded into latch register 32 will be 0010 0000 and the register produces the signal SW3 test if the induction test signal is to be injected into detection coil 10. On the other hand, if the induction test signal is to be applied to detection coil 12, the register is loaded with the value 0100 0000 so that it produces the signal SW2. Assuming the register is set to produce the signal SW2, the square wave output signal from DAC 26 passes through buffer 28, one of switches 30 and a resistor 36 to one end of detection coil 12.

The resulting current flow through detection coil 12 produces a periodically varying magnetic field with flux lines linking detection coil 10. As the flux linking coil 10 varies, an emf is induced in coil 10.

The number of flux lines produced by detection coil 12 is proportional to the inductance of coil 12 and the emf induced in coil 10 is proportional to the inductance of coil 10 hence the emf induced in coil 10 has a magnitude that is dependent on the inductances of both coils and may be measured to detect variations in the inductances of the coils. Thus, the inductances of both coils are tested simultaneously when the test signal is directed to detection coil 12.

According to known electrical principles, the emf induced in coil 10 is directly proportional to the time rate of change of the flux linkages. It is for this reason that a square wave is injected as the test signal.

The induced emf in coil 10 provides a potential difference between the ends of the coil which is amplified and filtered by detection circuit 14 and applied to ADC 18. Microcomputer 20 enables ADC 18 every 2.5 ms and transfers to the microcomputer a digital value representing the magnitude of the output signal CH0 from detection circuit 14.

The microcomputer includes a flash ROM ($E^2PROM$) memory. This memory stores two threshold values MAX and MIN. Since the magnitude of the square wave signal applied to coil 12 is known one may calculate from the circuit design of the detection channels what the maximum positive magnitude (X) of the output signal from the metal detector should be. The threshold values MAX and MIN are chosen to be greater than, and less than X, respectively. The differences between MAX and X and MIN and X are dependent on tolerance, that is, on how much variation in a detector output signal is acceptable without unduly affecting the performance of the detector. The tolerance value is added to X to determine MAX and subtracted from X to determine MIN. Having made this determination, the threshold values MAX and MIN are loaded into the $E^2PROM$ at the factory or when a new metal detector is installed and thus define a predetermined range of acceptable magnitudes of the detector output signal in response to the square wave signal.

The digital values produced by ADC 18 during the time the square wave is applied to coil 12 are applied to a positive peak detector 44 implemented by programming in the microcomputer 20. The peak detector determines the peak or largest of the digital values produced by the ADC 18. This peak value is then compared by a comparator 42 with MAX and MIN. If the peak value is greater than MAX or less than MIN, the microcomputer sends an error message via serial data link 23 and a microcomputer 25 to a display 40 to provide an operator with an indication that the inductance test of the metal detector coils has found an abnormal condition.

The coil inductance test described above does not measure the inductance of a detection coil nor does it provide an indication of which coil 10 or 12 is defective. It simultaneously tests the inductance of both coils and merely provides an indication that one of the coils is defective. This presents no problem since the coils are normally embedded in potting material and replaced as a unit in the event of a defect or failure.

The coil inductance test as described above assumed that the square wave signal was injected into coil 12 with the output signal from detection channel or circuit 14 being sampled by ADC 18. The test may also be performed by injecting the square wave into coil 10 while ADC 18 samples the output signal from detection channel or circuit 16. In this case latch register 32 is loaded with the value 0010 000 so that the signal SW3 is produced. SW3 enables a switch 30 so that the square wave from buffer 28 is applied through resistor 38 to coil 10. Microcomputer 20 controls ADC 18 so that the output signal from detection circuit 14 is sampled and transferred to the computer for comparison with MAX and MIN. The test result is the same, regardless of whether the test signal is injected into detection coil 10 or detection coil 12.

Although a specific preferred embodiment has been described in detail to illustrate the principles of the invention, it will be understood that various modifications and substitutions may be made in the described embodiment without departing from the spirit and scope of the invention as defined by the appended claims. The invention is not limited in practice to a specific metal detector but may be used in metal detectors of various designs having different coil configurations so long as the detector has inductively coupled detection coils. Furthermore, although the invention is admirably suited for use with metal detectors in forage harvesters, it may also be used in other machines or equipment wherein metal detectors are provided.

We claim:

1. A method for simultaneously testing the inductance of a first detection coil and a second detection coil in a metal detector having a first detection circuit and a second detection circuit, the first detection coil and the second detection coil being mutually inductively coupled and said first detection coil and said second detection coil being connected to the first detection circuit and said second detection circuit, respectively, said method comprising:

establishing a first threshold magnitude representing the minimum acceptable magnitude of an output signal from said metal detector in response to a test signal;

injecting said test signal into said first detection coil; and, while said test signal is being injected into said first detection coil, determining if said second detection circuit produces an output signal having a magnitude at least as great as said first threshold magnitude.

2. A method of simultaneously testing the inductance of detection coils in a metal detector having a magnetic detection field, at least a first detection coil and a second detection coil disposed in said magnetic detection field and arranged so that there is mutual inductance between said first detection coil and said second detection coil, said metal detector having a first detection circuit and a second detection circuit connected to said first detection coil and said second detection coil, respectively, for producing amplified output signals corresponding to signals induced in said first detection coil and said second detection coil as a metal object passes through said magnetic detection field, said method comprising:

injecting a test signal having a predetermined magnitude into said first detection coil;

sensing the magnitude of the output signal from said second detection circuit resulting from injecting said test signal into said first detection coil;

determining if the magnitude of said sensed output signal from said second detection circuit falls within a predetermined range of magnitudes; and producing an error signal when it is determined that said sensed output signal does not fall within said predetermined range of magnitudes.

3. A method as claimed in claim 2 wherein the test signal injected into said first detection coil is a square wave.

4. A method as claimed in claim 3 wherein the step of determining if the magnitude of the sensed output signal from the second detection circuit falls within a predetermined range of magnitudes comprises converting the magnitude of said sensed output signal to digital values, determining a peak magnitude among said digital values, and comparing said peak magnitude with threshold values defining limits of said range of magnitudes.

5. Apparatus for simultaneously testing the inductance of detection coils in a metal detector having a magnetic detection field, at least a first detection coil and a second detection coil disposed in said magnetic detection field and arranged so that there is mutual inductance between said first detection coil and said second detection coil, said metal detector having a first detection circuit and a second detection circuit connected to said first detection coil and said second detection coil, respectively, for producing amplified output signals corresponding to signals induced in said first detection coil and said second detection coil as a metal object passes through said magnetic detection field, said apparatus comprising:

means for injecting a test signal having a predetermined value into said first detection coil;

sensing means for sensing the magnitude of an output signal from said second detection circuit resulting from injecting said test signal into said first detection coil;

means for determining if the magnitude of said sensed output signal from said second detection circuit falls within a predetermined range of values; and, means for producing an error signal when it is determined that the magnitude of said sensed output signal does not fall within said predetermined range of values.

6. An apparatus as claimed in claim 5 wherein said sensing means comprises an analog to digital converter connected to and controlled by a microcomputer for converting the output signal from said second detection circuit into digital values representing the magnitude of said output signal, and said means for determining if the magnitude of said sensed output signal from said second detection circuit falls within said predetermined range of values comprises means in said microcomputer for storing first and second threshold values and means for comparing said threshold values with said digital values.

7. An apparatus as claimed in claim 5 wherein said means for injecting said test signal comprises a digital to analog converter, a microcomputer for controlling said digital to analog converter and supplying thereto successive code words representing the magnitude of a square wave signal at successive points in time whereby said digital to analog converter produces a square wave output signal, and means for applying said square wave output signal to said first detection coil as said test signal.

8. Apparatus as claimed in claim 6 wherein said comparing means includes a peak detector for detecting a peak value among said digital values, and a comparator for comparing said peak value with said first and second threshold values.

* * * * *